No. 726,157. PATENTED APR. 21, 1903.
L. P. GRAHAM.
CORN PLANTER.
APPLICATION FILED DEC. 27, 1902.
NO MODEL. 2 SHEETS—SHEET 1.
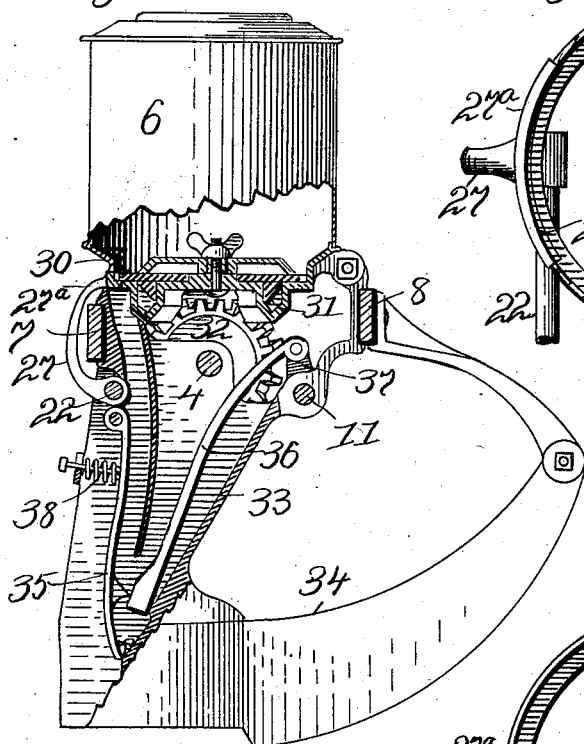
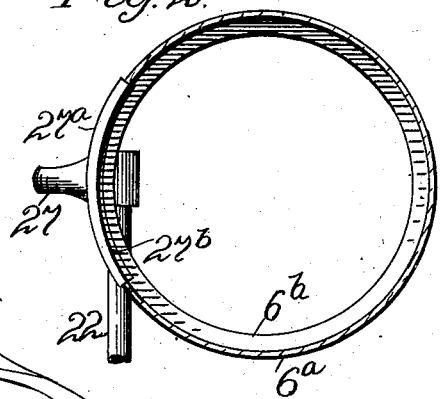
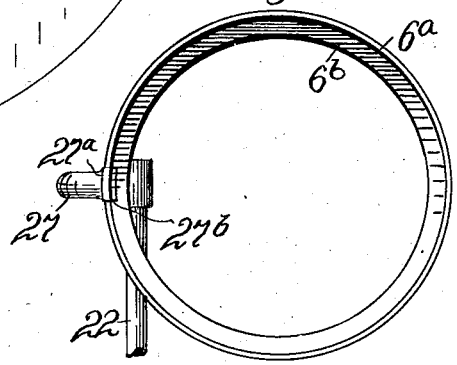
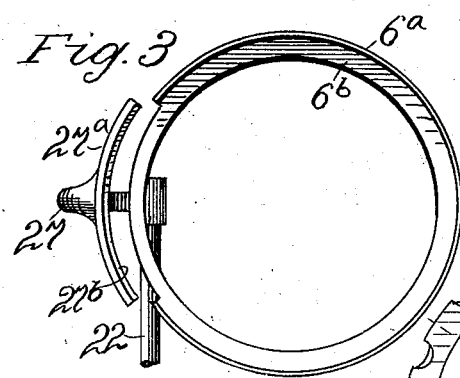
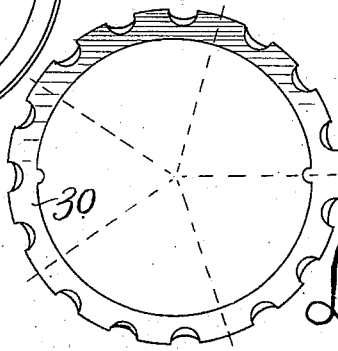
Witnesses.
Ina Graham.
Nora Graham.
Inventor,
L. P. Graham No. 726,157. PATENTED APR. 21, 1903.
L. P. GRAHAM.
CORN PLANTER.
APPLICATION FILED DEC. 27, 1902.
NO MODEL. 2 SHEETS—SHEET 2.
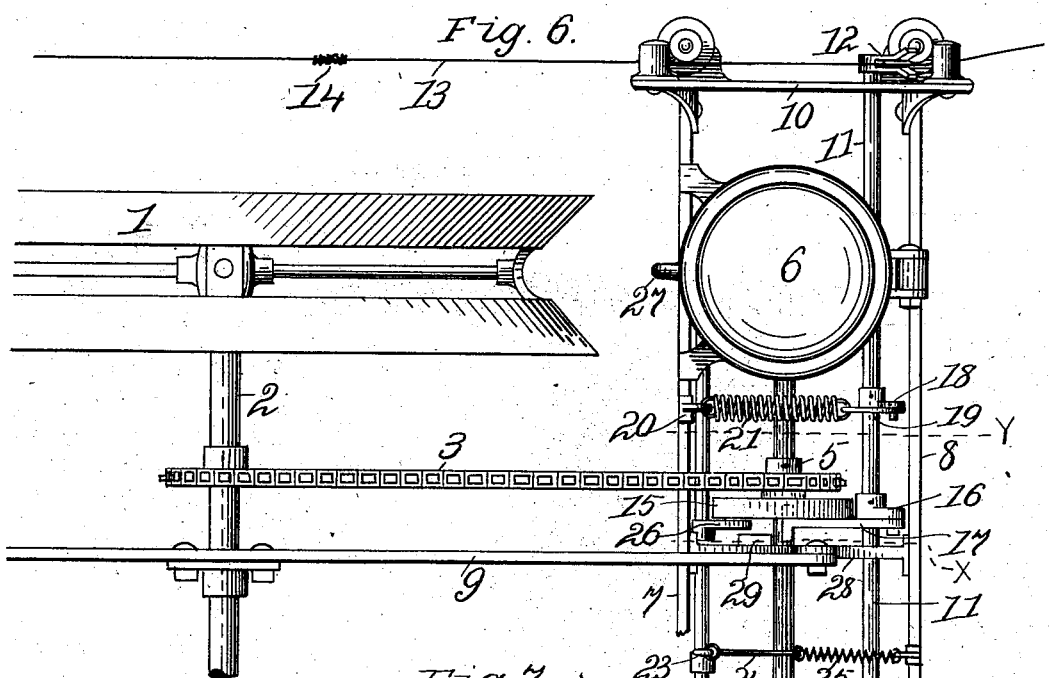
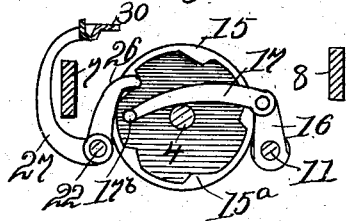
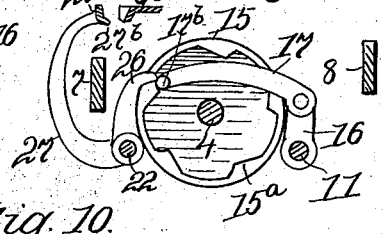
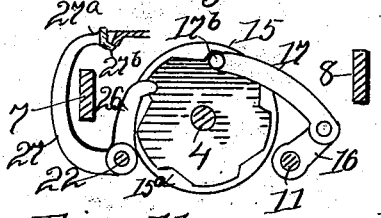
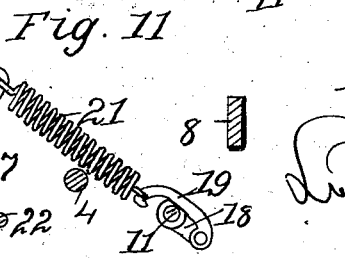
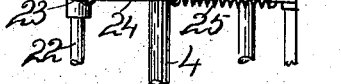
Witnesses.
Ina Graham
Nora Graham
Inventor.
L. P. Graham

UNITED STATES PATENT OFFICE.

LEVI P. GRAHAM, OF DECATUR, ILLINOIS.

CORN-PLANTER.

SPECIFICATION forming part of Letters Patent No. 726,157, dated April 21, 1903.

Application filed December 27, 1902. Serial No. 136,831. (No model.)

*To all whom it may concern:*

Be it known that I, LEVI P. GRAHAM, of the city of Decatur, county of Macon, and State of Illinois, have invented certain new and useful Improvements in Corn-Planters, of which the following is a specification.

This invention relates to planters in which the grains required for a hill are each dropped from a separate cell in the seed-plate; and the object is to provide means for discharging the required number of grains at proper intervals from a seedbox in which the seed-plate is continuously rotating.

In early experiments with individual-cell drop-planters the seed-plates were moved at cross-rows a partial rotation sufficient to carry the proper number of cells over the discharge-opening. This arrangement imposed too much work on the check-row wire to get best results, and for some years planters were built in which the seed-plates were rotated continuously from the covering-wheels, the grains drilled from the seed-plate accumulated in the shank of the planter while traveling between cross-rows, and the valve of the shank was opened at cross-rows to drop the accumulated grains. This style of planter had the advantage of easy continuous motion and light work on the check-row wire; but its accuracy depended on imparting the required partial rotation to the seed-plate while traveling from one cross-row to another, and it developed that slippage of the covering-wheels, unevenness of the soil, and possibly variation in the distance between check-row knots made it impossible to accumulate uniformly the same number of grains in the second drop while traveling from one knot to another. Later clutches were introduced into the drive-gearing connecting the covering-wheels with the seed-plates, the knots of the check-row wire were employed to actuate the clutches, and the clutch members separated automatically as soon as the seed-plates were rotated the distance required to drop hills of corn from the single grain-cells. The introduction of the clutch destroyed the continuous motion previously given to the seed-plates; but it made accurate dropping possible, and this more important result has enabled the clutch-planters, with their stop and start action, to secure favorable recognition from the manufacturers and users of planters.

By means of this invention the seed-plates are rotated continuously and the seed is dropped accurately, thus combining the desirable features of two types of planters.

The prominent characteristic of the invention is that the seed-plate rotates without discharging seed from its cells, except at certain intervals, and that the number of grains discharged at any one time is precisely what is desired to constitute a hill—that is to say, the seed-plate rotates continuously in a closed seedbox until the time comes to draw off the seed needed for a hill, and when that time comes the box is opened to permit the discharge of the required number of grains, no more and no less, and is then closed.

The opening and closing of the seedbox occurs while the planter is traveling between cross-rows, and the precise time of opening is determined by the mechanism used to rotate the seed-wheel, so that the seed-wheel may be in proper position to discharge a hill when the opening is made. The check-row mechanism is instrumental in providing means whereby the driving-gear for the seed-plate may open the seedbox, and in a general and somewhat indefinite way the check-row mechanism contributes to the timing of the opening of the box. When the check-row shaft is rocked backward to discharge a hill of corn from the second drop of the planter, mechanical conditions are developed which assure the opening of the seedbox as soon as the seed-plate is in proper position to drop the required number of grains without missing, dribbling, or miscounting.

It is obvious that the conditions must be just right to enable three grains, for instance, to be discharged from a seed-plate having a multiplicity of cells while the discharge of the seedbox is opened and closed and that there must be a mechanical correlation between the seed-plate and the box-opening mechanism to insure that result. The seed-plate rotates continuously by force derived from the covering or carrying wheels. The check-row fork encounters a knot at times uncontrolled by the means used to rotate the seed-plate, so that the knot cannot be relied on to furnish the opening force and determine the time of opening the box, yet the knot or other outside means is needed to determine extreme limits between which the opening and closing of the box must be accomplished. The cross-rows are about three feet and a half apart. The box must be opened somewhere in that distance to discharge a hill; but it must not be opened until the seed-plate is in proper position. Consequently I provide a seed wheel or plate with a plurality of cells and gear the seed-wheel with a carrying-wheel of the planter, so that the seed-wheel will rotate whenever the planter is drawn along a field. I provide a closure for the discharge-opening of the seedbox which fits against the seed-wheel when closed and forms a part of the seedbox-bottom. I establish incomplete mechanical connection between the driving mechanism for the gear-wheel and the seedbox-closure, and I use the check-row mechanism to complete the mechanical connection between the driving-gear for the seed-wheel and the closure for the seedbox. The mechanical connection between the closure and the driving-gear is timed to open the seedbox when the seed-wheel is in proper position to drop a hill of corn; but it is incomplete and inoperative until the check-row mechanism contributes the complementary element.

So long as the check-row mechanism is in its normal or prepared condition the seedbox will remain closed and the seed-wheel will rotate ineffectively therein. When the check-row mechanism is used to operate the second drop and discharge a hill of corn into the soil, the element needed to complete the box-opening mechanism will be supplied, and as soon as the seed-wheel is in proper place the element supplied by the check-row mechanism will be utilized in opening the seedbox.

There is usually a slight interval between the presentation of the complementary element by the check-row mechanism and the utilization of such element by the driving-gear, and that necessitates a pause or rest in the element. In other words, the element presented to the driving-gear by the check-row mechanism must remain in position to be utilized until the proper time comes. To provide the needed pause in the motion of the complementary element, I have devised the plan of throwing the check-row mechanism backward or operatively by means of a check-row knot or other outside influence and using motion derived from the carrying-wheel to move the check-row mechanism back to its original or normal position. The check-row mechanism remains in its extreme corn-depositing position until the complementary element of the box-opening mechanism is put into use, and the movement of the gear used to open the box is continued on the complementary element until the check-row mechanism is returned to its normal position.

Viewed from another point it may be said that the check-row mechanism is moved to a normal position by force derived from the carrying-wheel, that the means used to move the check-row mechanism forward will not engage out of time with the seed-wheel and the box-opening mechanism, and that the box is opened by the check-row mechanism in act of assuming a normal position. This version conforms to the particular mechanism used to embody the invention in this instance; but in a broad sense the invention resides in a rotary seed-wheel driven continuously from a carrying-wheel, a closure for the seedbox-opening, means contributed by the check-row mechanism for determining the action of the box-opening mechanism within certain limits, and means controlled from the driving-gear of the seed-wheel for determining the precise time of opening the seedbox and providing the opening force.

In the drawings forming part of this specification, Figure 1 is a vertical section through the dropping mechanism of a planter embodying my invention. Fig. 2 is a plan of the lower rim of a seedbox-bottom, showing an elongated discharge-opening therein closed by a removable closure. Fig. 3 is a plan of the lower rim of the seedbox, showing the closure opened to permit the discharge of a hill of corn. Fig. 4 is a plan of the lower rim of the seedbox, showing a narrow closure for a small discharge-opening. Fig. 5 is a plan of a seed wheel or plate. Fig. 6 is a plan of one end of a planter embodying my invention. Fig. 7 is a section on line X in Fig. 6, showing the box-opening mechanism and illustrating the conditions that exist when the check-row mechanism is in its normal or inoperative position. Fig. 8 is a section on line X in Fig. 6, showing the check-row shaft rocked backward. Fig. 9 is a section on line X in Fig. 6, showing how the seedbox is opened. Fig. 10 is a section on line X in Fig. 6, showing the check-row shaft rocked forward by force derived from the covering-wheel. Fig. 11 is a section on line Y in Fig. 6, showing the spring and bent link used to aid the check-row knots in operating the check-row shaft. Fig. 12 is a plan of the pawl through which the check-row shaft is returned to its normal position after an operative throw.

A covering-wheel is shown at 1, an axle-shaft at 2, a sprocket-chain at 3, a drill-shaft at 4, and a sprocket-wheel on the drill-shaft at 5. The chain imparts motion from the covering-wheel to the drill-shaft. The sprocket-wheel 5 is permanently fastened to the drill-shaft, and whenever the axle-shaft turns the drill-shaft turns with it. The drill-shaft has gear-wheels, as 32 in Fig. 1, which mesh with the gearing 31 of the seed-wheels 30, and consequently the seed-wheels partake of the motion of the drill-shaft and the covering-wheel.

A seedbox is shown at 6, the rear cross-bar of the runner-frame is shown at 7, and the front cross-bar of the runner-frame is shown at 8. One of the side bars of the rear frame of the planter is shown at 9, and such bar is in this instance hinged to a bridge-bracket 28. A check-row wire 13 has knots 14, and it runs through guide-pulleys in a check-row head 10. A check-row shaft 11 is journaled in the runner-frame. It extends from side to side thereof, and it has a forked lever 12, through which the wire runs and on which the knots act to rock the check-row shaft backward.

An internally-toothed ratchet-wheel 15 is fixed onto the drill-shaft, so as to turn therewith, an arm 16 is fastened to the check-row shaft 11, and a pawl 17 is pivotally connected with arm 16 in position to engage the teeth $15^a$ of the ratchet-wheel. The pawl 17 has a lateral stud $17^a$ on its swinging end extending into the face of the ratchet-wheel, and it also has a stud $17^b$ extending in the opposite direction and coöperating with a cam 29 on bridge-bracket 28. When the stud $17^a$ engages a tooth of the ratchet-wheel, the free end of the pawl is carried upward and forward, and as stud 17 rises it rides over cam 29 and prevents the pawl from falling out of contact with the ratchet-wheel before the check-row shaft is completely returned to its original position. An arm 18 is fastened onto the check-row shaft, a bent link 19 is pivotally connected with the swinging end of the arm, and a spring 21 is connected at one end with the bent link and at the other end with a bracket 20 on cross-bar 7. The spring pulls lengthwise of the arm 18, while the check-row shaft is rocked forward and forms a dead-center lock. As soon as the dead-center lock is broken the spring aids the knot on the check-row wire to operate the check-row mechanism and holds the check-row shaft rocked backward until motion is imparted from the ratchet-wheel to the pawl to rock the check-row shaft forward. The action of the ratchet-wheel, the pawl, and the spring 21 has been described at length in Patent No. 713,563, granted to me November 11, 1902.

A shaft 22 extends from one planter-shank to the other below the seedboxes. At each seedbox an arm 27 is secured to shaft 22 and shaped at its upper end to close the discharge-opening of the box. The lower rim of the seedbox comprises a horizontal runway $6^b$ and a vertical wall $6^a$, through both of which the discharge-opening extends. The arm 27 has a horizontal part $27^b$, which completes the runway of the seedbox when the discharge-opening is closed, and a vertical wall $27^a$, which closes the vertical part of the discharge-opening. A seed plate or wheel 30 has seed-cells in its perimeter, and it is adapted to run in the bottom of the seedbox, with the runway $6^b$ forming bottoms for the cells and the vertical wall $6^a$ closing the open sides of the cells. When the discharge-opening is closed, the runway and the vertical wall are intact and the grains in the cells are carried around the bottom of the seedbox indefinitely. The discharge-opening is preferably made long enough to discharge the grains required for a drop simultaneously, and in this instance the opening extends one-fifth of the circumference of the seedbox-bottom. The seed-wheel 30 is divided, theoretically, into five hill-spaces, as indicated by dotted lines in Fig. 5, and a number of cells required for a hill are formed in each of the five divisions. In this instance there are three cells in a space, which is the usual number; but there may be two or four cells to meet a demand for thin or thick planting. The ratchet-wheel 15 has a number of teeth $15^a$, corresponding to the number of hill-spaces into which the seed-plate is divided.

An arm 23 is fastened to shaft 22 and a spring 25 pulls on the arm through a link 24 and holds the closure-arm 27 in position to close the discharge-opening of the seedbox. An arm 26 is secured to shaft 22, and its end projects into the path described by the end of pawl 17 in returning the check-row shaft to its normal position.

The free end of pawl 17 rests on shaft 4, while the check-row shaft is rocked forward, as shown in Fig. 7. When the forked lever 12 encounters a check-row knot, the pawl is moved to the position shown in Fig. 8, and as soon as a tooth of the ratchet-wheel encounters the pawl the pawl rises with the ratchet-wheel, strikes the arm 26, and by forcing the arm out of the path of the pawl overcomes the tension of spring 25 and opens the discharge of the seedbox. As the pawl travels past the end of arm 26 the spring 25 snaps the closure-arm against the seedbox and the pawl continues its travel to the position shown in Fig. 10, whence it falls to the position shown in Fig. 7.

The gear-wheels 31 and 32 have an equal number of teeth, the seed-wheel and the drill-shaft run at the same speed, and so the seed-wheel may be forced to assume the proper position to drop a hill through the discharge-opening of the seedbox at the time a tooth of the ratchet-wheel forces the end of the pawl against the arm 26. This is done by opening the seedbox just as the last cell of a set is riding over the discharge-space.

The discharge-opening may be made small enough to discharge but a single grain of corn at once, as shown in Fig. 4, and in that case the engaging end of arm 26 would be elongated, so that the box would be held open until the required number of cells passed over the discharge-opening.

The cells are adapted to hold each a single grain of corn standing on edge, and so the horizontal ledge $27^b$ of the box-closure may be quite narrow. The closure is opened with a sudden motion, which has the double tendency to carry the grains out of the cells and to jerk the ledge from under the cells; but to assure dislodgment of the grains from ledge 27ᵇ the ledge may be slightly beveled, as shown in Figs. 7 and 8.

The second drop mechanism may be of any desired construction; but I prefer to use the structure described in Patent No. 701,712, granted to me June 3, 1902, and shown in a general way in Fig. 1 of the drawings. The planter-shank is shown at 33 in Fig. 1, the runner or furrow-opener at 34, a valve for the shank at 35, a spring for the valve at 38, and a plunger at 36. An arm 37 is fastened to the check-row shaft and the plunger is pivotally connected with the swinging end of the arm.

I claim—

1. In a planter, the combination of a seed-box, a bottom for the seedbox having a discharge-opening, a closure for the discharge-opening of the seedbox, a seed-wheel in the seedbox, means for rotating the seed-wheel and means for opening the seedbox-closure at intervals.

2. In a planter, the combination of a seed-box, a bottom for the seedbox having a discharge-opening, a seed-wheel in the seedbox, such wheel having peripheral cells, a closure for the discharge-opening bearing normally against the seed-wheel, means for rotating the seed-wheel continuously and means for opening the box-closure at intervals.

3. In a planter, the combination of a seed-box, a bottom for the seedbox having a discharge-opening, such opening being cut through the box-bottom and through a side of the box, a seed-wheel located in the seedbox on the bottom thereof and provided with peripheral cells, a closure for the discharge-opening normally closing against the perimeter of the seed-wheel and the under side thereof, means for rotating the seed-wheel continuously and means for opening the box-closure at intervals.

4. In a planter, the combination of a seed-box, a seed-wheel in the box, means for closing the box to prevent the discharge of seed from the seed-wheel, means for rotating the seed-wheel continuously by motion derived from the travel of the planter, check-row mechanism, and means for opening the seed-box at intervals to permit the discharge of seed from the seed-wheel; said box-opening means being controlled in a general way by the check-row mechanism and in a specific way by the means used to rotate the seed-wheel.

5. In a planter, the combination with a seed-box, a seed-wheel in the box, a carrying-wheel, and check-row mechanism; of a closure for the box, gear for driving the seed-wheel from the carrying-wheel, and box-opening gearing driven by the carrying-wheel through a mechanical element supplied at intervals by the check-row mechanism.

6. In a planter, the combination with a seed-box, a seed-wheel in the box, a carrying-wheel and check-row mechanism, of a closure for the box, gear for driving the seed-wheel from the carrying-wheel, incomplete gearing between the carrying-wheel and the box-closure, and a mechanical element controlled by the check-row mechanism to complete the box-opening gearing when the check-row mechanism is operated.

7. In a planter, the combination of a seed-box, a seed-wheel in the seedbox having single-grain cells occupying a plurality of hill-forming spaces, a drill-shaft driven by the travel of the planter and geared to the seed-wheel, an internally-toothed ratchet-wheel on the drill-shaft the teeth whereof correspond in number to the hill-forming spaces of the seed-wheel, a closure for the discharge-opening of the seedbox, a check-row shaft, a pawl carried on an arm of the check-row shaft, said pawl being adapted to engage the teeth of the ratchet-wheel when the check-row shaft is rocked backward and to be returned to its original position by the ratchet-wheel, and an arm of the box-closure mechanism extending alongside the face of the ratchet-wheel in position to be struck by the pawl, as the ratchet-wheel returns the pawl to its normal position, and to open the box for the passage of seed from the seed-wheel by force derived from impact with the pawl.

In testimony whereof I sign my name in the presence of two subscribing witnesses.

LEVI P. GRAHAM.

Witnesses:
E. S. McDONALD,
ROSA VOELCKER.